(12) United States Patent
Gourlaouen et al.

(10) Patent No.: US 6,265,687 B1
(45) Date of Patent: Jul. 24, 2001

(54) METHOD OF USING A TERNARY GASEOUS MIXTURE IN THE PLASMA PROJECTION OF REFRACTORY MATERIALS

(75) Inventors: Vincent Gourlaouen, Houilles; Francois Remy, Franconville, both of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/497,184

(22) Filed: Feb. 3, 2000

Related U.S. Application Data

(62) Division of application No. 09/207,421, filed on Dec. 8, 1998, now Pat. No. 6,126,858.

(30) Foreign Application Priority Data

Dec. 10, 1997 (FR) .................................................. 97 15625

(51) Int. Cl.⁷ .................................................... B23K 10/00
(52) U.S. Cl. ................................. 219/76.16; 219/121.47; 219/121.46; 219/121.59; 427/446; 427/453
(58) Field of Search ............................ 219/121.47, 76.16, 219/76.15, 121.59, 121.55, 121.51, 75; 427/453, 455, 446, 535

(56) References Cited

U.S. PATENT DOCUMENTS

| | | | | |
|---|---|---|---|---|
| 3,617,349 | * | 11/1971 | Prasse | 277/235 A |
| 3,958,097 | * | 5/1976 | Fabel et al. | 219/121.47 |
| 4,788,077 | * | 11/1988 | Kang | 427/34 |
| 5,271,869 | | 12/1993 | Nicoud et al. . | |

FOREIGN PATENT DOCUMENTS

| | | |
|---|---|---|
| 0 451 051 | 10/1991 | (EP) . |
| 0 664 181 | 7/1995 | (EP) . |
| 2 639 346 | 5/1990 | (FR) . |
| 58-029581 | 2/1983 | (JP) . |
| 62-279083 | 12/1987 | (JP) . |

* cited by examiner

Primary Examiner—Mark Paschall
(74) Attorney, Agent, or Firm—Young & Thompson

(57) ABSTRACT

A plasmagenic gas comprises a ternary mixture of helium, argon and hydrogen. The gas contains less than 30% helium, at least 55% argon, and from 5.5 to 15% hydrogen. The gas is energized to form a plasma. A powder of a refractory or metallic material is introduced into the plasma.

11 Claims, No Drawings

METHOD OF USING A TERNARY GASEOUS MIXTURE IN THE PLASMA PROJECTION OF REFRACTORY MATERIALS

CROSS-REFERENCE TO RELATED APPLICATIONS

This application is a division of application Ser. No. 09/207,421, filed Dec. 8, 1998, and now U.S. Pat. No. 6,126,858, which corresponds to French application 97 15625 of Dec. 10, 1997, the disclosure of which is incorporated herein by reference.

FIELD OF THE INVENTION

The present invention relates to a plasmagenic ternary gaseous mixture and its use in a plasma projection process, particularly of refractory materials.

BACKGROUND OF THE INVENTION

Plasma projection is a thermal treatment process permitting producing a surface coating on an object, a member or the like, said coating being then adapted, as the case may be, to fulfill a role as a deposit for anti-wear, anti- corrosion, anti-friction or thermal and/or electrical barrier purposes.

In a manner known per se, plasma projection is a process for thermal coating consisting in introducing a particular material into a plasmagenic gas jet within which the particles are melted and accelerated before striking the surface of the piece to be coated.

Among the different types of particular materials usable in a plasma projection process, can be mentioned metallic powders constituted by a pure metal or an alloy of several metals, composite powders, for example a powder of tungsten carbide in a matrix of cobalt, or ceramic powders such as refractory oxides, for example oxides of aluminum, zircon, chromium, mixed compounds of the aluminum/titanium mixture type...

Conventionally, the gases used for plasma projection are particularly binary, ternary or quaternary mixtures of argon, hydrogen, nitrogen and/or helium whose respective proportions vary considerably as a function particularly of the material projected and/or of the material to be coated.

Thus, EP-A-0 451 051 discloses a plasmagenic gas mixture constituted by a ternary mixture of helium, argon and hydrogen, which contains 30 to 700 helium, 10 to 50% argon and a to 25% hydrogen. Moreover, EP-A-0 639 427 discloses itself gaseous mixtures comprising 4 to 5 constituents, namely mixtures comprising argon, helium, hydrogen, carbon dioxide and/or oxygen.

Furthermore, binary argon/hydrogen and argon/helium mixtures have already been disclosed.

At present, the plasma projection processes use different types of torches which can be divided into two categories, namely high power torches and low power torches.

More particularly, the high power torches operate conventionally at high current intensities, typically of the order of 500 to 600 A and high gas flow rates, for example of the order of 50 to 60 l/mn.

This type of torch is conventionally used particularly for the deposit of refractory materials, for example of the zirconium yttrium type.

Conversely, low power torches operate at lower current intensities, generally from about 300 to 450 A, and at lower gas flow rates, for example of the order of 30 to 40 l/mn.

Until now, low power torches have been little used for the plasma projection of refractory materials, except in certain cases, for example when heat output must be relatively low so as to avoid overheating the support.

However, more and more, it is desired to make the use of low power torches generally useful for all types of plasma projection work of refractory materials, so as to obtain results at least comparable to those obtained with high power torches used at present.

However, it has been noted by the inventors of the present invention that the plasmagenic gaseous mixtures used until now with high power torches are not suitable for low power torches. Thus, tests carried out by means of ternary mixtures of argon/hydrogen/helium according to the prior art have shown too high a power, leading to rapid deterioration of the torch.

SUMMARY OF THE INVENTION

The object of the present invention is therefore to provide a plasmagenic gas adapted to be used particularly with low power torches, whilst permitting a substantial increase of the projection output relative to conventional mixtures.

The present invention thus relates to a plasmagenic gas constituted by a ternary mixture of helium, argon and hydrogen, characterized in that it contains less than 30% helium, at least 55% argon, and from 5.5 to 15% hydrogen.

As the case may be, the plasmagenic gas according to the invention can have one or several of the following characteristics:

- it contains at least 60% argon;
- it contains from 15 to 29% helium and preferably at least 20% helium;
- it contains from 6 to 14% hydrogen, preferably 7 to 13% hydrogen, still more preferably 8 to 12% hydrogen, and more preferably about 10%+1% of hydrogen;
- it contains about 70%+5k argon;
- it contains about 10% hydrogen, from 20 to 25% helium, the rest being argon and as the case may be impurities.

The invention moreover relates to the use of the above-mentioned plasmagenic gas for the plasma projection of at least one powder of a metallic or refractory material, such as a ceramic.

The invention also relates to a process for thermal projection adapted to use a plasmagenic gas according to the invention, particularly a process in which the plasmagenic gas is delivered by a low power torch.

According to another aspect, the invention also relates to a process for the production of a ternary plasma- genic gaseous mixture, in which the ternary mixture comprises argon, helium and hydrogen, said mixture being adapted to be produced directly at the utilization site, or being adapted to be brought to the utilization site by means of conduits, bottles or the like.

DETAILED DESCRIPTION OF THE INVENTION

The present invention will now be described in greater detail with the help of examples given by way of illustration but not by way of limitation.

EXAMPLES

Deposits of a powder $ZrO_2/Y_2O_3$ (with 7% $Y_2O_3$) on steel specimens have been carried out by means of a low power torch of conventional type, such as the torch sold by the SULZER- METCO company under the mark SM-F100 CONNEX.

Prior to plasma projection, the test specimens were sandblasted with CORINDON (grade 300).

Tests E1 and E2 were carried out, with a plasmagenic gas having variable contents of argon, hydrogen and helium, as given in the following table.

In each test, there was determined:

the porosity of the deposit obtained by observation of the latter with a sweeping electronic microscope and the determination of the presence or absence of particles of unmelted or poorly melted $ZrO_2/Y_2O_3$;

increase output of projection relative to a reference (REF) $Ar/H_2$; and the condition of the torch, which is to say ultimate deterioration of the nozzle.

The results obtained are given in the following table.

TABLE

| TEST NO. | E1 | E2 | REF |
|---|---|---|---|
| Ar (%) | 70 | 65 | 90 |
| H$_2$ (%) | 10 | 10 | 10 |
| He (%) | 20 | 25 | 0 |
| Intensity (A) | 340 | 340 | 340 |
| Voltage (V) | 49 | 49 | 46 |
| Powder Flow Rate (G/mn) | 29 | 29 | 29 |
| Flow Rate of Powder Vector Gas (1/mn) | 2.1 | 2.1 | 2.1 |
| Total Porosity (%) | 7.2 | 9.9 | 8.9 |
| Increase of Output (%) | +22 | +22 | 0 |
| Torch Deterioration | no | no | N.D. |

N.D.: Not determined.

It will be seen from the preceding table that the favorable results are obtained for tests E1 and E2, which is to say for plasmagenic gases having a content of argon, hydrogen and helium according to that of the gas of the present invention.

Thus, in the case of tests E1 and E2, there is seen an increase of output of about 22% with lower porosity of 10% and an absence of deterioration of the nozzle of the torch.

As a result, the plasma projection of the refractory materials, such as $ZrO_2/Y_2O_3$, using a ternary mixture (argon/helium/hydrogen) containing less than 30% helium, preferably 20 to 25% helium, at least 55% argon, and 5 to 15% hydrogen, preferably about 8 to 10% hydrogen, permits obtaining in a surprising manner an increase of output, a completely acceptable porosity and an absence of deterioration of the nozzle of the torch.

As a result, the plasmagenic gas according to the invention could suitably be used in a process of thermal projection, particularly a process for plasma projection of at least one powder of a refractory material, such as $Cr_2O_3$ or $ZrO_2/Y_2O_3$, . . .

Preferably, the plasma projection operation will be carried out at a flow rate of 30 to 40 l/mn and/or at a current intensity of 450 A.

What is claimed is:

1. A method for plasma projecting at least one powder of a material selected from the group of refractory and metal to produce a coating on an object, comprising the steps of:

supplying a plasmagenic gas consisting essentially of a ternary mixture of helium, argon and hydrogen, containing less than 30% helium, at least 55% argon and 5.5 to 15% hydrogen;

energizing the gas to form a plasma; and introducing the powder into the plasma.

2. A method according to claim 1, wherein the gas contains at least 60% argon.

3. A method according to claim 1, wherein the gas contains 15 to 29% helium.

4. A method according to claim 1, wherein the gas contains at least 20% helium.

5. A method according to claim 1, wherein the gas contains 6 to 14% hydrogen.

6. A method according to claim 1 wherein the gas contains 8 to 12% hydrogen.

7. A method according to claim 1, wherein the gas contains 10%±1% hydrogen.

8. A method according to claim 1, wherein the gas contains 70%±5% argon.

9. A method according to claim 1, wherein the gas contains about 10% hydrogen, 20 to 25% helium, the rest being substantially argon.

10. A method according to claim 1, wherein the plasma is formed in a low power torch operating at about 300 to 450 Amperes.

11. A method according to claim 1, wherein the powder is one of $Cr_2O_3$ powder and a $ZrO_2/Y_2O_3$ powder.

* * * * *